United States Patent [19]

Tsukamoto et al.

[11] Patent Number: 4,749,143

[45] Date of Patent: Jun. 7, 1988

[54] RETRACTOR WITH BOTH EMERGENCY AND AUTOMATIC LOCKING MECHANISMS

[75] Inventors: Masahiro Tsukamoto; Katsuo Takiura, both of Kanagawa, Japan

[73] Assignee: Nippon Seiko Kabushiki Kaisha, Tokyo, Japan

[21] Appl. No.: 921,424

[22] Filed: Oct. 22, 1986

[30] Foreign Application Priority Data

Oct. 30, 1985 [JP] Japan .................... 60-167235[U]

[51] Int. Cl.⁴ ..................... A62B 35/02; B65H 75/48
[52] U.S. Cl. ...................... 242/107.4 A; 242/107.4 R
[58] Field of Search ................ 57/107.4 R, 107.4 A, 57/107.4 B; 242/107 R

[56] References Cited

U.S. PATENT DOCUMENTS

| | | | |
|---|---|---|---|
| 3,412,952 | 11/1968 | Wohlert et al. | 242/107.4 B |
| 4,436,255 | 3/1984 | Matsui et al. | 242/107.4 A |
| 4,437,623 | 3/1984 | Wyder | 242/107.4 A X |
| 4,452,405 | 6/1984 | Adomeit | 242/107.4 A |
| 4,518,132 | 5/1985 | Schmidt | 242/107.4 R X |
| 4,552,319 | 11/1985 | Gavagan et al. | 242/107.4 A |
| 4,555,075 | 11/1985 | Schmidt et al. | 242/107.4 A |
| 4,565,338 | 1/1986 | Takada | 242/107.4 B |
| 4,566,649 | 1/1986 | Petersen, III | 242/107.4 A |
| 4,573,646 | 3/1986 | Willey | 242/107.4 A |
| 4,619,418 | 10/1986 | Butenop | 242/107.4 A |

Primary Examiner—Donald Watkins
Attorney, Agent, or Firm—Wegner & Bretschneider

[57] ABSTRACT

A retractor with both emergency and automatic locking mechanisms is provided. The retractor has take-up spindle means; a ratchet wheel; a pawl member engageable with the ratchet wheel and displaceable between a first position, where the pawl member prevents any further rotation of the take-up spindle means in the webbing-releasing direction, and a second position where the pawl member is maintained out of engagement with the ratchet wheel, said pawl member normally assuming the second position; control means for bringing the pawl member to the first position when the webbing is wound on the take-up spindle means after release of the webbing over at least a predetermined first length from the take-up spindle means and then to the second position when the webbing has been taken up over at least a predetermined second length; and an emergency locking mechanism for sensing an emergency state to prevent any further rotation of the take-up spindle means in the webbing-releasing direction.

11 Claims, 10 Drawing Sheets

RETRACTOR WITH BOTH EMERGENCY AND AUTOMATIC LOCKING MECHANISMS

BACKGROUND OF THE INVENTION

(1) Field of the Invention

This invention relates to a retractor which is equipped with an emergency locking mechanism and an automatic locking mechanism - which once the rotation of a take-up spindle in the webbing-releasing direction is locked, continuously locks the take-up spindle unless this locking is released by a certain operation—and allows to change the automatic locking mechanism from a state ready to actuate to a state not ready to actuate and vice versa by suitably changing the wound state of the webbing on the take-up spindle.

(2) Description of the Prior Art

Retractors equipped solely with either emergency locking mechanisms or automatic locking mechanisms have conventionally been known. Even while webbings are worn, the former retractors permit a relatively greater degree of freedom to the wearers and the wearers do not feel too much pressures from the webbings. The release of webbings is prevented in the case of the latter retractors, and the wearers hence feel relatively large pressures from the webbings.

Baggage or an auxiliary child's seat (hereinafter called "baggage" collectively) is sometimes strapped on a conventional passenger seat by using its associated webbing. In the case of an automatic locking retractor, the release of the webbing is prevented when the baggage is strapped. Therefore, the baggage is firmly held on the seat. However, the release of the webbing is not prevented normally in the case of an emergency locking retractor. There is hence an imminent danger that the webbing is pulled out little by little from the retractor by vibrations and moderate braking and the strapping of the baggage becomes looser while the car is driven.

It is hence desired to develop a retractor having the merits of both emergency locking retractor and automatic locking retractor.

SUMMARY OF THE INVENTION

With the foregoing in view, the present invention has as its primary object the provision of a retractor which can meet the above-mentioned demand without making the mechanism unduly complex or large.

In one aspect of this invention, there is thus provided a retractor with both emergency and automatic locking mechanisms, comprising:

take-up spindle means biased in the webbing-winding direction;

a ratchet wheel mounted on the take-up spindle means;

a pawl member engageable with the ratchet wheel and displaceable between a first position, where the pawl member prevents any further rotation of the take-up spindle means in the webbing-releasing direction, and a second position where the pawl member is maintained out of engagement with the ratchet wheel, said pawl member normally assuming the second position;

control means for bringing the pawl member to the first position when the webbing is wound on the take-up spindle means after release of the webbing over at least a predetermined first length from the take-up spindle means and then to the second position when the webbing has been taken up over at least a predetermined second length; and an emergency locking mechanism for sensing an emergency state to prevent any further rotation of the take-up spindle means in the webbing-releasing direction.

In another aspect of this invention, there is also provided a retractor with both emergency and automatic locking mechanisms, comprising:

take-up spindle means biased in the webbing-winding direction;

a ratchet wheel mounted on the take-up spindle means;

a pawl member engageable with the ratchet wheel and displaceable between a first position, where the pawl member prevents any further rotation of the take-up spindle means in the webbing-releasing direction, and a second position where the pawl member is maintained out of engagement with the ratchet wheel, said pawl member normally assuming the second position;

a lock arm displaceable between a first state in which the lock arm holds the pawl member at the first position and a second state in which the lock arm is maintained out of contact with the pawl member;

means for biasing the lock arm selectively in the first or second state;

detection means provided rotatably following the rotation of the take-up spindle means, said detecting means being adapted to act on the lock arm to cause the lock arm to move toward the first state upon release of the webbing over at least the predetermined first length and toward the second state upon take-up of the webbing over the predetermined second length;

actuator means capable of assuming an acting position upon rotation of the take-up spindle means in the webbing-releasing direction and assuming a non-acting position upon rotation of the take-up spindle means in the webbing-winding direction, said actuator means being engageable at the acting position thereof with the lock arm so as to prevent the lock arm from moving toward the first state but being maintained out of engagement with the lock arm at the non-acting position; and a sensor capable of sensing an emergency state to bring the pawl member to the first position.

According to the present invention, the webbing is once released over at least a predetermined length and is then rewound in order to actuate the automatic locking mechanism. It is hence possible to design the retractor in such a way that the emergency locking mechanism is allowed to function substantially over the entire range of released webbing length while permitting the actuation of the automatic locking mechanism upon release of the webbing over a relatively small length.

BRIEF DESCRIPTION OF THE INVENTION

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
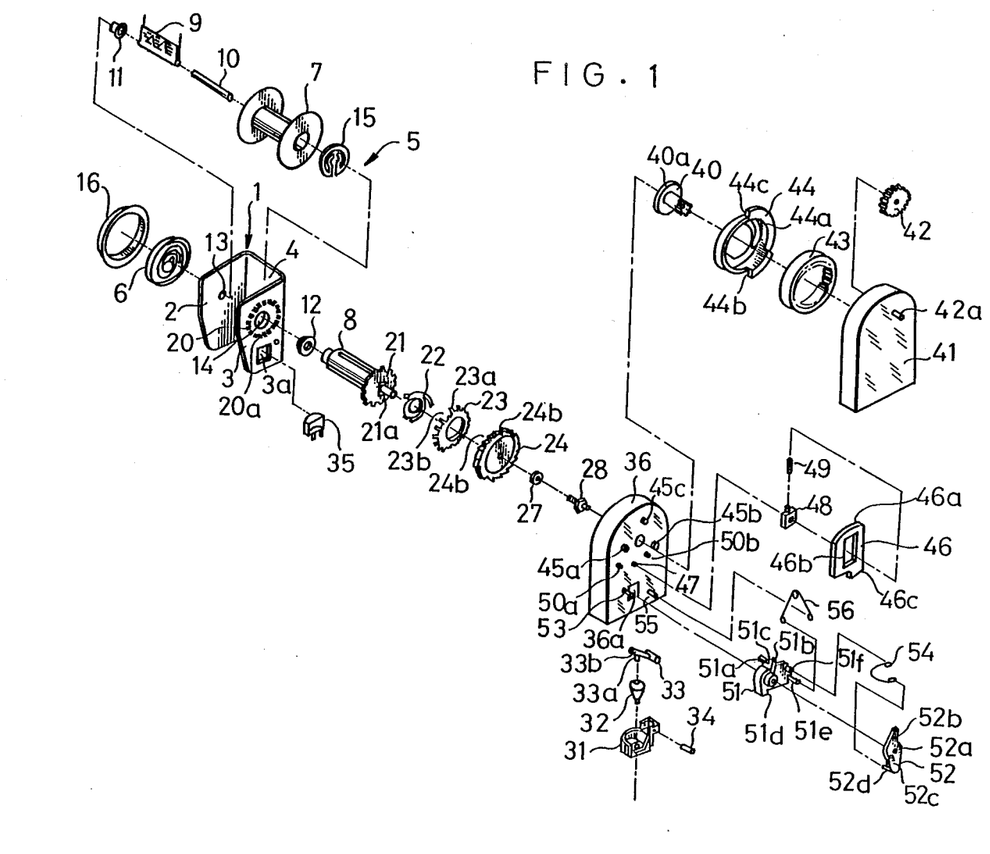
FIG. 1 is an exploded perspective view of a retractor according to a first embodiment of this invention.

Referring first to FIG. 1 which is a perspective view of a retractor according to the first embodiment of this invention, a base 1 of the retractor has two side walls 2,3, which are opposite to each other, and a rear wall 4 extending between the side walls 2,3. Between the side walls 2,3, take-up spindle means 5 is rotatably supported. The take-up spindle means 5 is biased in the webbing-winding direction by means of a take-up spring 6. The take-up spindle means 5 includes a bobbin 7 and a shaft 8 extending through the bobbin 7. Slots are formed through the bobbin 7 and shaft 8, through which a fastened to a stick-like stopper 10 so that the webbing 9 is prevented form slipping out of the bobbin 7 and shaft 8. The take-up spindle means 5 is supported via bushes 11,12 on the edges of circular through-holes 13,14, which are formed through the side walls 2,3 respectively. Axial movements of the take-up spindle means 5 are limited by a retainer ring 15.

The take-up spring 6 is enclosed under a cover 16 provided on the side wall 2.

A plurality of locking projections 20 are formed at an equal interval around the circular through-hole 14 on the side wall 3 of the base 1. The leading side of each of the projections 20 as seen in the clockwise direction in FIG. 1 serves as a latching surface 20a. A latch plate 21 is mounted on an outer end portion (i.e., a righthand end portion as seen in FIG. 1) of the shaft 8 in such a way that the latch plate 21 is allowed to rotate as a unitary member together with the shaft 8. On the outer periphery of the latch plate 21, a plurality of latching teeth 21a are formed at an equal interval.

Further outside the latch plate 21 a latch-up spring 22, a latch ring 23 and a latch frame 24 as a ratchet wheel are loose-fit successively by a washer 27 and a self-tapping screw 28 on the shaft 8. The latch ring 23 is displaceable along the axis of the shaft 8 and is biased outwards by the latch-up spring 22. The latch ring 23 includes a plurality of L-shaped teeth 23a, the axially-extending portions of which are always maintained in engagement with the latching teeth 21a of the latch plate 21. The latch ring 23 is also provided with a projection 23b which is maintained in engagement with a cam surface 24a (see, FIG. 2) formed on the inner wall of the latch frame 24. On the outer peripheral wall of the latch frame 24, there are formed a plurality of teeth 24b directed in the webbing-releasing direction and adapted to engage a subsequently-described sensor arm as a pawl member.

A sensor case 31 is fixedly secured on a lower part of the side wall 3. A weight 32 as a sensor is mounted within the hollow space of the sensor case 31. In addition, a sensor arm 33 which has a projection 33a and a tip 33b and serves as a pawl member is provided swingably by a pin 34 on the sensor case 31.

On the inner surface of the side plate 3, there is also provided a dust cover 35 for preventing penetration of dust and the like through an opening 3a in which the sensor case 31 is secured. On the outer wall of the side plate 3, there is also provided a mounting member 36 which covers all members on the side wall 3 and also serves as a mounting base for the following members.

A speed-reducing gear mechanism is provided on the mounting member 36. The speed-reducing gear mechanism is composed of a main gear 40 fit fixedly and externally on the self-tapping screw 28, a subordinate gear 42 rotatable about a shaft 42a secured fixedly on an outer cover 41, and a follower 43 equipped with internal teeth. A control plate 44 is loose-fit inside the follower 43. An arcuate slot 44a is formed through the control plate 44. A pin 43 extends inwardly from the inner wall of the follower 43 into the arcuate slot 44a (see, FIG. 4 for example). The follower 43 and control plate 44 are provided on three protuberances 45a,45b,45c formed on the mounting member 36 so that a gap is left between the follower 43 and control plate 44 and the mounting member 36 (see, FIG. 2).

Within this gap, there is disposed a friction plate 46 as actuator means. The upper surface of the friction plate 46 is formed in a curved surface 46a, which is maintained in contact with a cylindrical surface 40a of the main gear 40. A still further protuberance 47 is also formed on the mounting member 36, on which a spring hook 48 is fit. The spring hook 48 is fit in a rectangular slot 46b formed through the friction plate 46 and a compression spring 49 extends between the spring hook 48 and friction plate 46. Owing to the provision of the compression spring 49, the friction plate 46 is biased in such a direction that the curved surface 46a of the friction plate 46 is urged against the cylindrical surface 40a. The friction plate 46 is swingable together with the spring hook 48 about the protuberance 47. The range of swinging motion of the friction plate 46 is limited by paired stopper pins 50a,50b.

A lock arm, which is composed of a main part 51 and another part 52 swingable relative to the main part 51, is also provided swingably about a pivot 53 on the mounting member 36. On the main part 51, there is formed a rod portion 51a which extends inwardly through the opening 36a of the mounting member 36. When the main part 51 swings upwardly, namely, counterclockwise together with the swingable part 52, the rod portion 51a acts on the sensor arm 33 and lifts the latter upwardly.

The swingable part 52 is swingable about a pin 52a. The swingable part 52 is equipped at an upper part thereof with a first engagement portion 52b for engagement with the flange 44b of the control plate 44 and at a lower part thereof with a protuberance 52c and spring hook 52d. On the main part 51, there are formed second and third engagement portions 51b,51c in order from the outer side for engagement with the edge 44c of a sectorial part of the control plate 44 and a tab 46c of the friction plate 46 as well as a stopper 51d for the swingable part 52 and spring hooks 51e,51f.

The range of swinging motion of the swingable part 52 about the pin 52a is limited by the contact between the protuberance 52c and stopper 51d with respect to the clockwise turning motion of the swingable part 52. The main part 51 and swingable part 52 are biased by a return spring 54 provided between the hooks 52d and 51f so that the protuberance 52c and stopper 51d are normally maintained in contact to each other. The first to third engagement portions 52b,51b, 51c are positioned in this order from the outer side.

A return spring 56 is provided as biasing means between a hook 51e of the main part 51 and another hook 55 on the mounting member 36, whereby the lock arm composed of the main part 51 and swingable part 52 is biased as will be described herein. The magnitude of the biasing force of the return spring 54 is chosen at a value sufficient to actuate the main part 51 counterclockwise against the biasing force of the other return spring 56 when a counterclockwise force is applied to the first engagement portion 52b of the swingable portion 52 and the counterclockwise force is then transmitted to the main part 51 via the return spring 54.

Detection means is composed by the main gear 40, subordinate gear 42, follower 43 and control plate 44. This detection means in turn constitutes, together with the friction plate 46, main part 51, swingable part 52 and return springs 54,56, control means for the sensor arm 33.

Figure 2:
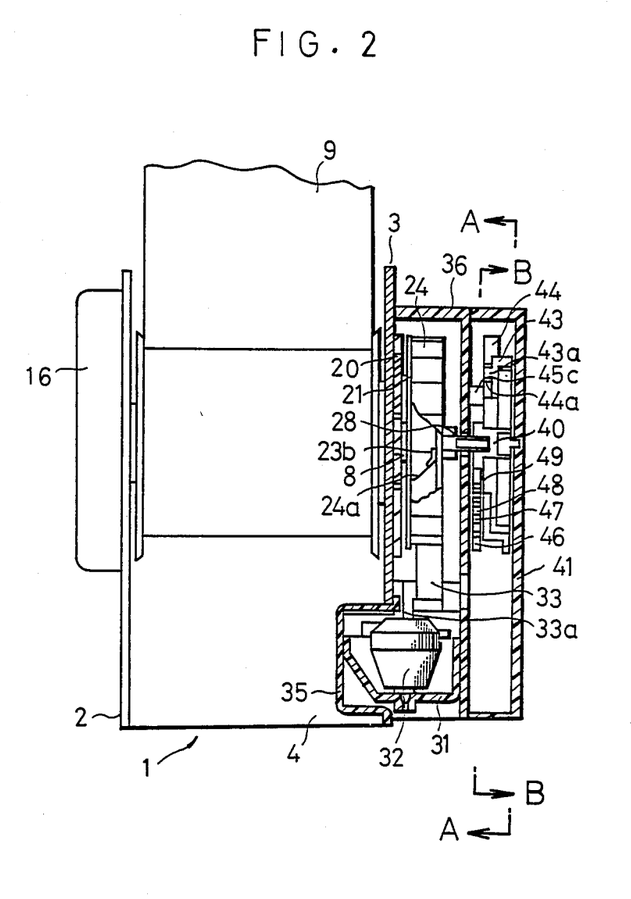
FIG. 2 is a partially cross-sectional front elevation of the retractor of the first embodiment.

The above-described members (except for the main part 51, etc.) are shown in their assembled form in the partially cross-sectional view of FIG. 2.

Figure 3:
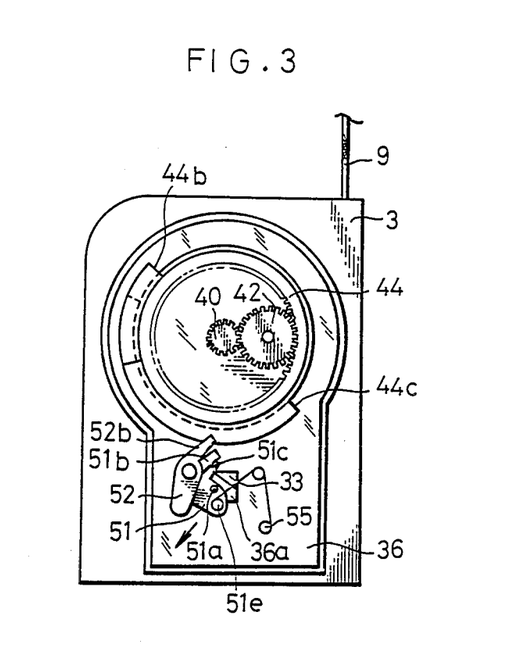
FIG. 3 is a cross-sectional view as seen in the direction indicated by arrows III,III in FIG. 2, which illustrates the operation of the retractor of the first embodiment.
Figure 4:
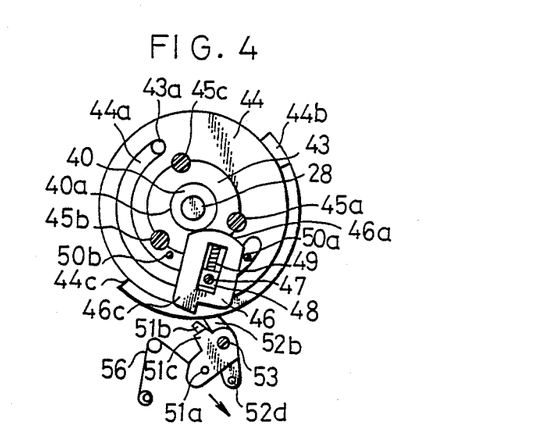
FIG. 4 is a cross-sectional view as seen in the direction indicated by arrows IV,IV in FIG. 2, which also illustrates the operation of the retractor of the first embodiment.

The operation of the retractor of the first embodiment will next be described. When the webbing is wound up over the entire length thereof, as illustrated in FIGS. 3 and 4, the main part 51 takes the second state swung clockwise in FIG. 3 by the biasing force (in the direction indicated by the arrow) of the return spring 56. Here, the swingable part 52 is also located at a position swung clockwise relative to the main part 51 as viewed in FIG. 3 by the force of the return spring 56. Accordingly, the rod portion 51a of the main part 51 is maintained apart from the sensor arm 33 and owing to its own weight, the sensor arm 33 assumes the second position where it is apart from the teeth 24b of the latch frame 24. Namely, the automatic locking mechanism is in a state not ready to actuate.

Figure 5:
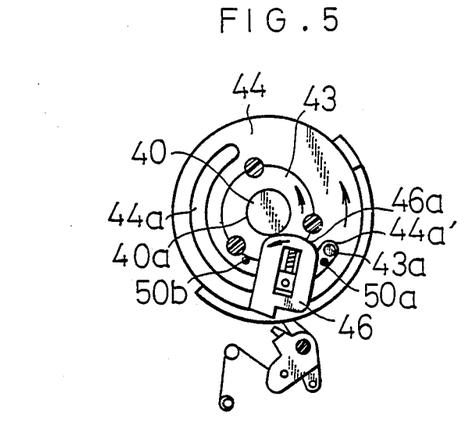
FIGS. 5, 7, 8, 10, 11, 13 and 15 are similar to FIG. 4 and also illustrate the operation of the retractor of the first embodiment.

When it is started to pull out the webbing 9, the follower 43 begins to turn counterclockwise as indicated by an arrow in FIG. 5. The follower 43 is allowed to turn freely until the pin 43a of the follower 43 is brought into contact with one edge 44a' of the arcuate slot 44a of the control plate 44. As soon as the pin 43a is brought into contact with the edge 44a', the control plate 44 also starts turning counterclockwise as viewed in FIG. 5. Here, the cylindrical surface 40a of the main gear 40 turns clockwise. As a result, the friction plate 46 which is maintained at the curved surface 46a in contact with the cylindrical surface 40a is drawn by a frictional action and turns in the (counterclockwise) direction as indicated by an arrow in FIG. 5. The friction plate 46 then moves to the side of the stopper pin 50b different from the stopper pin 50a with which the friction plate 46 has been in contact by that time (i.e., the friction plate 46 has moved from the position not ready to act to the position ready to act).

Figure 6:
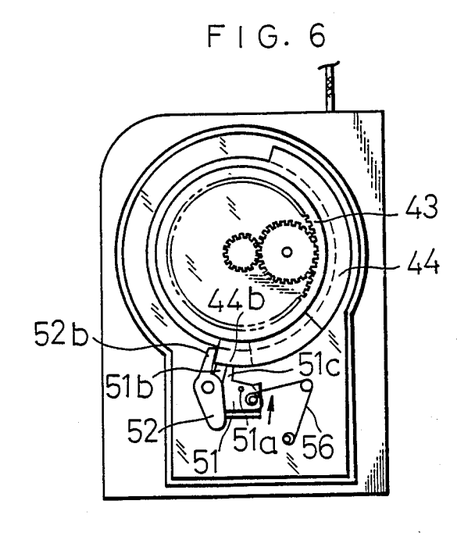
FIGS. 6, 9, 12 and 14 are similar to FIG. 3 and also illustrate the operation of the retractor of the first embodiment.

When the webbing 9 is pulled out further over the predetermined first length, the follower 43 and control plate 44 turn clockwise as viewed in FIG. 6 so that the flange 44b of the control plate 44 is brought into engagement with the first engagement portion of the swingable part 52. Accordingly, the lock arm composed of the main part 51 and swingable part 52 receives a counterclockwise force as viewed in FIG. 6 and turns in the same direction against the force of the return spring 56, whereby the state of the lock arm has changed from the second state to the intermediate state shown in FIG. 6. Namely, the main part 51 has been brought at the third engagement portion 51c into contact with tab 46c of the friction plate 46 located at the position ready to act and is hence no longer able to turn counterclockwise. The main part 51 and swingable part 52 hence remain in the intermediate state (see, FIG. 7). The rod portion 51a of the main part 51 does not still interfere with the sensor arm 33 in this intermediate state and the sensor arm 33 is allowed to remain at the second position where the sensor arm 33 is maintained out of engagement with the teeth 24b of the latch frame 24. In this intermediate state, the main part 51 is biased by the return spring 56 in the counterclockwise direction as indicated by an arrow in FIG. 6, namely, toward the first state.

Figure 8:
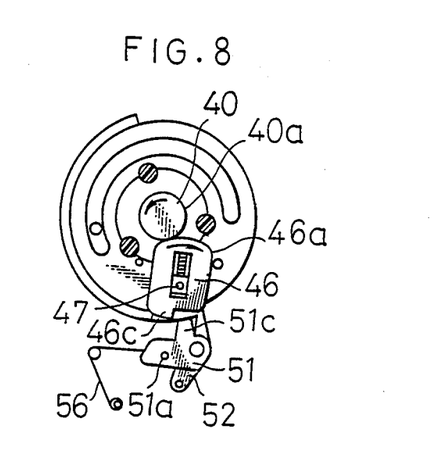

When it is started to rewind the webbing 9 at this stage, the friction plate 46 is caused to swing about the protuberance 47 in the clockwise direction as indicated by an arrow in FIG. 8 owing to the frictional action between the cylindrical surface 40a of the main gear 40, which rotates counterclockwise as indicated by an arrow in FIG. 8, and the friction plate 46, so that the friction plate 46 returns again to the non-acting position shown in FIG. 4. As a consequence, the engagement between the tab 46c of the friction plate 46 and the third engagement portion 51c of the main part 51 is released and the main part 51 is brought, together with the swingable part 52, to the first state by the biasing force of the return spring 56. The sensor arm 33 is therefore lifted by the rod portion 51a of the main part 51 to the first position where the sensor arm 33 is engageable with the teeth 24b of the latch frame 24. When one attempts to pull out the webbing 9 at this stage, the release of the webbing is locked.

In the manner described above, the actuation of the automatic locking mechanism is materialized.

Figure 7:
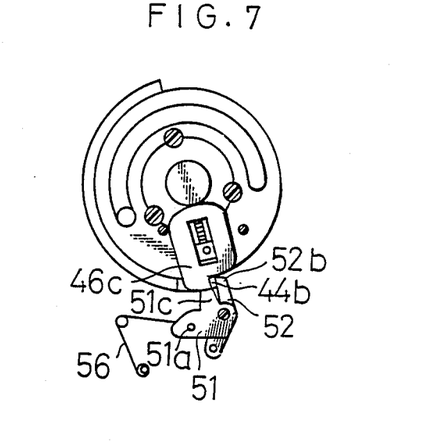
Figure 9:
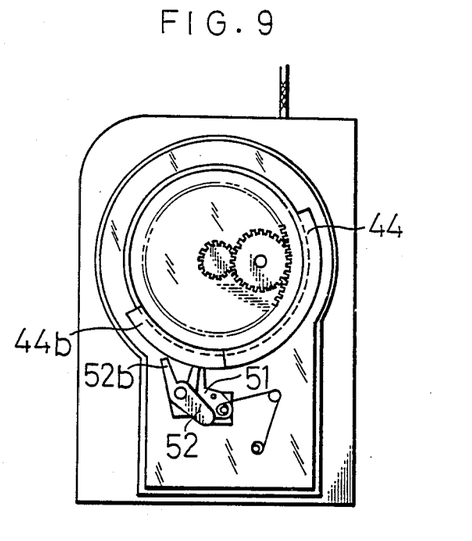
Figure 10:
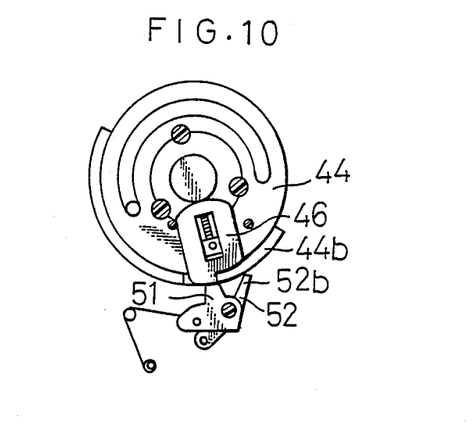
Figure 11:
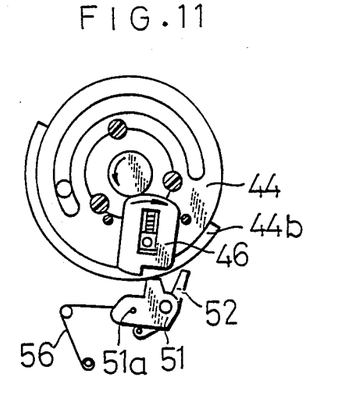

It is also possible to pull out the webbing 9 further (for example, substantially over its whole length) without actuation of the automatic locking mechanism by starting the rewinding of the webbing in the webbing-released state depicted in FIGS. 6 and 7. In this case, the control plate 44 turns clockwise as viewed in FIG. 9 (counterclockwise as viewed in FIG. 10). The main part 51 hence continues to remain at the position shown in FIG. 6 owing to its engagement with the friction plate 46 but the swingable part 52 swings counterclockwise as viewed in FIG. 9 (clockwise as viewed in FIG. 10) against the biasing force of the return spring 54. Therefore, the first engagement portion 52b of the swingable part 52 rides on the outer peripheral surface of the flange of the control plate 44. In other words, the lock arm composed of the main part 51 and swingable part 52 is constructed in such a way that it permits release of the webbing 9 beyond the predetermined first length while taking the intermediate state. After this stage, the automatic locking mechanism is rendered ready to actuate as described with reference to FIG. 8 no matter at which time point the rewinding of the webbing 9 is started. When the rewinding of the webbing 9 is started, for example, after it has been pulled out substantially over its entire length, the friction plate 46 swings clockwise to the non-acting position as depicted in FIG. 11. While the swingable part is still riding on the outer peripheral surface of the flange 44b of the control plate 44, the main part 51 is swung clockwise as viewed in FIG. 11 by the biasing force of the return spring 56 and the lock arm is brought to the first state. In this manner, the sensor arm 33 is lifted to the first position by the rod portion 51a of the main part 51.

Figure 12:
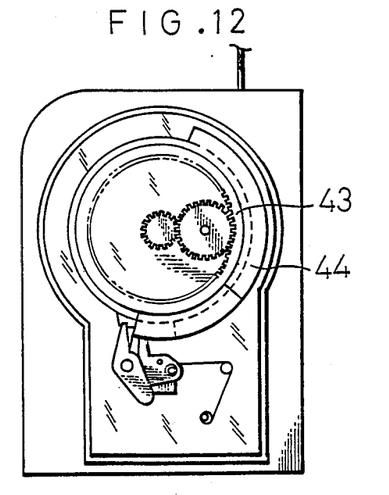
Figure 13:
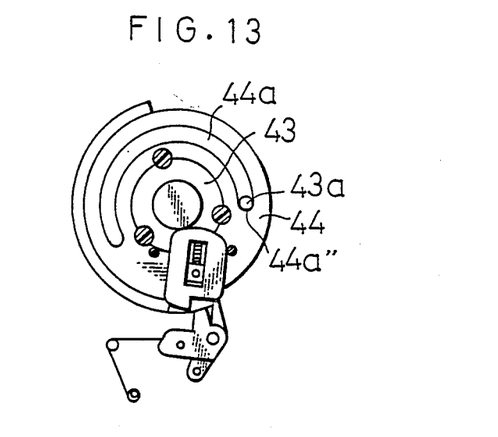

When it is started winding the webbing 9 from the state shown in FIG. 8, the follower 43 is allowed to move freely over a predetermined angle until the pin 43a is brought into contact with an edge 44a" (see, FIG. 13) opposite to the edge 44a' of the arcuate slot 44a of the control plate 44. Thereafter, the follower 43 rotates together with the control plate 44 in the counterclockwise direction as viewed in FIG. 12 (clockwise as viewed in FIG. 13).

Figure 14:
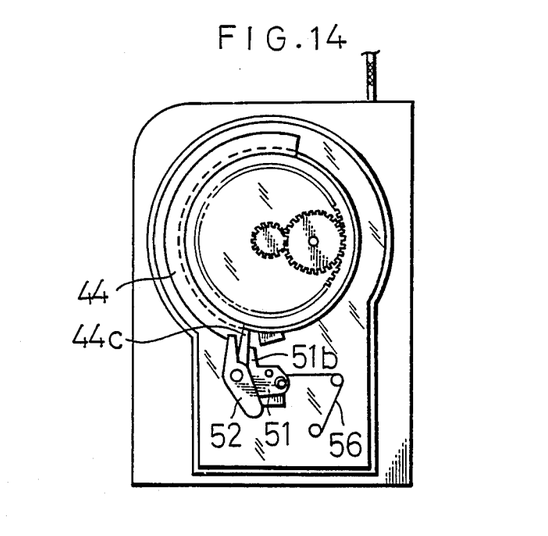
Figure 15:
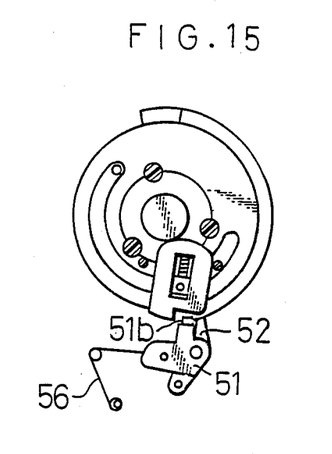

When the webbing 9 is taken up further over the predetermined second length, the edge 44c of the sectorial portion of the control plate 44 is brought into contact with the second engagement portion 51b of the main part 51 of the lock arm which is in the first state (see, FIG. 14). As a consequence, the main part 51 is caused to swing together with the swingable part 52 in the clockwise direction as viewed in FIG. 14 (counterclockwise as viewed in FIG. 15) against the biasing force of the return spring 56, whereby the main part 51 is brought back to the second state depicted in FIG. 3. Accordingly, the rod portion 51a of the main part 51 is also separated from the sensor arm 33 and the sensor arm 33 is hence allowed to return to the second position by its own weight. In this manner, the automatic locking mechanism is again rendered not ready to work and the emergency locking mechanism is rendered ready to function.

Substantially the same operation also takes place when it is started winding the webbing 9 from the state illustrated in FIG. 11. The lock arm takes the state shown in FIGS. 14 and 15 by way of the state depicted in FIGS. 12 and 13, thereby to render the automatic locking mechanism not ready to work.

When one tries to pull out the webbing 9 while the sensor arm 33 is at the first position, the release of the webbing is locked. This operation will next be described.

Since the rotation of the latch frame 24 in the webbing-releasing direction is stopped by the sensor arm 33, the latch ring 23 rotates in the webbing-releasing direction relative to the latch frame 24 and as a consequence, the latch ring 23 moves inward against the biasing force of the spring 22 under the action of the lug 23b and cam surface 24a while being guided by the latch plate 21. The teeth 23a of the latch ring 23 are hence brought into engagement with the latching surfaces 20a of the locking projections 20 and the take-up spindle means 5 and base member 1 are finally connected to each other to lock the release of the webbing.

Figure 16:
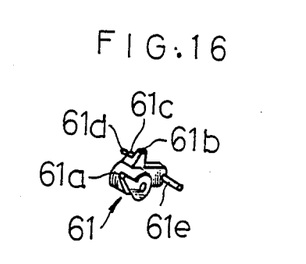
FIG. 16 is a perspective view of a lock arm employed in a retractor according to the second embodiment of this invention.

The second embodiment will next be described. The second embodiment is different from the first embodiment only in that as shown in FIG. 16, the lock arm 61 is composed of a single piece of united parts.

The lock arm 61 has first—third engagement portions 61a–61c, rod portion 61d and hook 61e which correspond respectively to first to third engagement portions 52b,51b,51c and the rod portions 51a,51e respectively.

Figure 17:
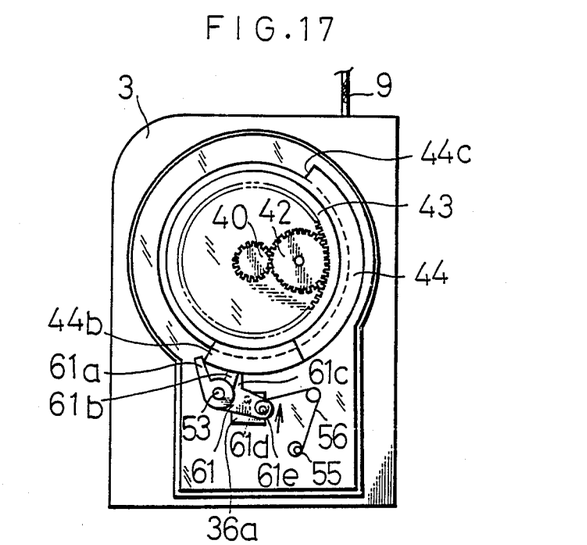
FIGS. 17 and 18 are similar to FIG. 3 and illustrate the operation of the retractor of the second embodiment.
Figure 18:
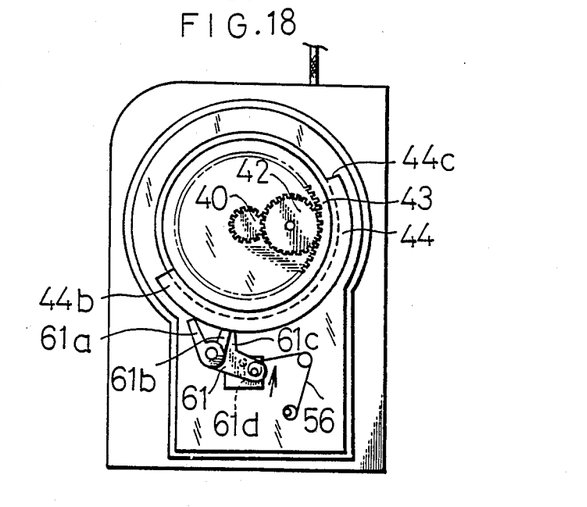

The operation of the second operation is substantially the same as the first embodiment. The state corresponding to that illustrated in FIG. 6 of the first embodiment is shown in FIG. 17, while the state corresponding to FIG. 9 of the first embodiment is illustrated in FIG. 18. The common parts are identified by the same symbols.

In the second embodiment, the lock arm 61 has the first engagement portion 61a as a projection which begins to engage the edge of the flange 44b of the control plate 44, which constitutes the detection means, at the time point where the detection means detects the release of the webbing 9 over the predetermined first length and upon further release of the webbing and movement of the control plate 44, projects out at such an angle that allows the control plate 44 to move while the lock arm 61 assumes the intermediate state, in other words, rides on the outer peripheral wall of the flange 44b.

Having now fully described the invention, it will be apparent to one of ordinary skill in the art that many changes and modifications can be made thereto without departing from the spirit or scope of the invention as set forth herein.

We claim:

1. A retractor comprising:
   take-up spindle means biased in the webbing-winding direction;
   a ratchet wheel mounted on the take-up spindle means;
   a pawl member engageable with the ratchet wheel land displaceable between a first position, where the pawl member prevents any further rotation of the take-up spindle means in the webbing-release direction, and a second position where the pawl member is maintained out of engagement with the ratchet wheel, said pawl member normally assuming the second position;
   a lock arm displaceable between a first state in which the lock arm holds the pawl member at the first position and a second state in which the lock arm is maintained out of contact with the pawl member;
   means for biasing the lock arm selectively in the first or second state;
   detection means following the rotation of the take-up spindle means, said detection means being adapted to act on the lock arm to cause the lock arm to move toward first state upon release of the webbing over at least a predetermined first length and toward the second state upon take-up of the webbing over a predetermined second length; and
   actuator means capable of assuming an acting position upon receipt of a rotational force of the take-up spindle means in the webbing-releasing direction and assuming a non-acting position upon receipt of a rotational force of the take-up spindle means in the webbing-winding direction, said actuator means being engageable at the acting position thereof with the lock arm so as to prevent the lock arm from moving toward the first state but being maintained out of engagement with the lock arm at the non-acting position.

2. The retractor as claimed in claim 1, further comprising a sensor capable of sensing an emergency state to bring the pawl member to the first position.

3. A retractor comprising:

take-up spindle means biased in the webbing-winding direction;

a ratchet wheel mounted on the take-up spindle means;

a pawl member engageable with the ratchet wheel and displaceable between a first position, where the pawl member prevents any further rotation of the take-up spindle means in the webbing-releasing direction, and a second position where the pawl member is maintained out of engagement with the ratchet wheel, said pawl member normally assuming the second position;

a lock arm displaceable between a first state in which the lock arm holds the pawl member at the first position and a second state in which the lock arm is maintained out of contact with the pawl member;

means for biasing the lock arm selectively in the first or second state;

detection means following the rotation of the take-up spindle means, said detection means being adapted to act on the lock arm to cause the lock arm to move toward the first state upon release of the webbing over at least a predetermined first length and toward the second state upon take-up of the webbing over a predetermined second length; and actuator means capable of assuming an acting position upon rotation of the take-up spindle means in the webbing-releasing direction and assuming a non-acting position upon rotation of the take-up spindle means in the webbing-winding direction, said actuator means being engageable at the acting position thereof with the lock arm so as to prevent the lock arm from moving toward the first state but being maintained out of engagement with the lock arm at the non-acting position;

wherein the detection means comprises a follower connected to the take-up spindle means by way of a speed-reducing gear mechanism and a control plate connected to the follower with a predetermined degree of play therebetween and the control plate is engageable with the lock arm.

4. The retractor as claimed in claim 3, wherein the control plate is rotatable about the axis of the take-up spindle means and has a first engagement portion engageable with the lock arm to bring the lock arm to the first state and a second engagement portion for bringing the lock arm to the second state, and the first and second engagement portions are provided with a predetermined angular interval therebetween.

5. The retractor as claimed in claim 3, further comprising a sensor capable of sensing an emergency state to bring the pawl member to the first position.

6. A retractor comprising:

take-up spindle means biased in the webbing-winding direction;

a ratchet wheel mounted on the take-up spindle means;

a pawl member engageable with the ratchet wheel and displaceable between a first position, where the pawl member prevents any further rotation of the take-up spindle means in the webbing-releasing direction, and a second position where the pawl member is maintained out of engagement with the ratchet wheel, said pawl member normally assuming the second position;

a lock arm displaceable between a first state in which the lock arm holds the pawl member at the first position and a second state in which the lock arm is maintained out of contact with the pawl member;

means for biasing the lock ar selectively in the first or second state;

detection means following the rotation of the take-up spindle means, said detection means being adapted to act on the lock arm to cause the lock arm to move toward the first state upon release of the webbing over at least a predetermined first length and toward the second state upon take-up of the webbing over a predetermined second length; and actuator means capable of assuming an acting position upon rotation of the take-up spindle means in the webbing-releasing direction and assuming a non-acting position upon rotation of the take-up spindle means in the webbing-winding direction, said actuator means being engageable at the acting position thereof with the lock arm so as to prevent the lock arm from moving toward the first state but being maintained out of engagement with the lock arm at the non-acting position;

wherein the actuator means is a friction plate which can act upon reception of a friction force from the take-up spindle means.

7. The retractor as claimed in claim 6, additionally comprising stoppers for limiting the range of movement of the friction plate and a spring biasing the friction plate against the take-up spindle means.

8. The retractor as claimed in claim 6, further comprising a sensor capable of sensing an emergency state to bring the pawl member to the first position.

9. A retractor comprising:

take-up spindle means biased in the webbing-winding direction;

a ratchet wheel mounted on the take-up spindle means;

a pawl member engageable with the ratchet wheel and displaceable between a first position, where the pawl member prevents any further rotation of the take-up spindle means in the webbing-releasing direction, and a second position where the pawl member is maintained out of engagement with the ratchet wheel, said pawl member normally assuming the second position;

a lock arm displaceable between a first state in which the lock arm holds the pawl member at the first position and a second state in which the lock arm is maintained out of contact with the pawl member;

first biasing means for biasing the lock arm selectively in the first or second state, said lock arm comprising a main part connected to the first biasing means and a movable part displaceable relative to the main part;

detection means following the rotation of the take-up spindle means, said detection means being adapted to act on the movable part of the lock arm to cause the lock arm to move toward the first state upon release of the webbing over at least a predetermined first length and to act on the main part of the lock arm to cause the lock arm to move toward the second state upon take-up of the webbing over a predetermined second length; and actuator means capable of assuming an acting position upon rotation of the take-up spindle means in the webbing-releasing direction and assuming a non-acting position upon rotation of the take-up spindle means in the webbing-winding direction, said actuator means being engageable at the acting position thereof with the lock arm so as to prevent the lock arm from moving toward the first state but being maintained out of engagement with the lock arm at the non-acting position.

10. The retractor as claimed in claim 9, further comprising a second biasing means for maintaining the movable part at a predetermined position relative to the main part, wherein the biasing force of the second biasing means is greater than that of the first biasing means.

11. The retractor as claimed in claim 9, further comprising a sensor capable of sensing an emergency state to bring the pawl member to the first position.

* * * * *